US006420968B1

(12) United States Patent
Hirsch

(10) Patent No.: US 6,420,968 B1
(45) Date of Patent: Jul. 16, 2002

(54) METHOD AND COMMUNICATION SYSTEM FOR HANDLING ALARMS USING A MANAGEMENT NETWORK THAT HAS A NUMBER OF MANAGEMENT LEVELS

(75) Inventor: Lucian Hirsch, München (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/354,133

(22) Filed: Jul. 15, 1999

(30) Foreign Application Priority Data

Jul. 15, 1998 (DE) .......................................... 198 31 825

(51) Int. Cl.[7] .............................................. G08B 29/00
(52) U.S. Cl. ...................... 340/506; 340/525; 340/3.43; 714/25; 714/100; 706/45; 700/9
(58) Field of Search ................................. 340/506, 525, 340/3.43; 714/25, 100; 706/45; 700/9

(56) References Cited

U.S. PATENT DOCUMENTS

| 4,816,208 A | * | 3/1989 | Woods et al. | ................ 340/525 |
| 5,388,189 A | * | 2/1995 | Kung | ........................... 706/45 |
| 5,408,218 A | * | 4/1995 | Svedberg et al. | ............ 340/507 |
| 5,638,494 A | * | 6/1997 | Pinard et al. | ................. 709/202 |
| 5,664,093 A | * | 9/1997 | Barnett et al. | ................ 714/31 |
| 5,708,772 A | * | 1/1998 | Zeldin et al. | .................. 714/25 |
| 5,771,274 A | * | 6/1998 | Harris | .................... 340/825.16 |
| 6,012,152 A | * | 1/2000 | Douik et al. | ................... 714/26 |
| 6,233,610 B1 | * | 5/2001 | Hayball et al. | .............. 709/223 |

* cited by examiner

Primary Examiner—Donnie L. Crosland
(74) Attorney, Agent, or Firm—Laurence A. Greenberg; Werner H. Stemer; Ralph E. Locher

(57) ABSTRACT

In a management network, active alarms are received by management devices, acting as agent or as superior manager, each of which can be stored on any of the management devices and can be handled for a specific period of time by operators. The management devices can have different management levels. Operators are coupled to the management devices to handle active alarms for a specific period of time. A checking function is introduced having one or more checking attributes for reciprocal information about alarm handling between the management devices. The checking function having the checking attributes results in automatic coordination between the management devices situated in a manager-agent relationship on different management levels during alarm handling.

20 Claims, 3 Drawing Sheets

METHOD AND COMMUNICATION SYSTEM FOR HANDLING ALARMS USING A MANAGEMENT NETWORK THAT HAS A NUMBER OF MANAGEMENT LEVELS

BACKGROUND OF THE INVENTION

Field of the Invention

The invention relates to a method and a corresponding communication system for handling alarms using a management network that has at least two management devices on different management levels.

The principles of a management network, which are also called Telecommunications Management Network or TMN principles, define a number of management levels having management devices for managing a communication system (i.e., a mobile communication system), each level having a dual function. In the managing system, every level except for the bottom level has a manager function for the level situated below it. In the managed system, every level except for the top level has an agent function for the next higher level.

Fault management is an important part of TMN management. In principle, on the basis of faults in the communication system, active alarms can be generated, notified to the agent on a management level and, from there, forwarded to the manager on the next higher management level. As is known, the alarms can be received by the management devices in each case, can be stored either by the management device acting as agent or by the management device acting as superior manager and can be handled for a specific period of time by operators, which are each coupled to the management devices. Hence, one exemplary application of time-dependent alarm handling is when one management device is responsible only during the day and the other management device is responsible only at night and on particular days.

The management devices have the operators coupled to them, and these perform one or more alarm handling functions, e.g., confirmation of the alarm, examination of the fault message using the alarm data received, undertaking measures for eliminating the fault, processing information about the outcome of fault elimination. These functions can be controlled and performed independently of one another by the management devices or their operators during the period of their responsibility.

German Published, Non-Prosecuted Patent Application DE 197 52 614 A1 specifies a method and a communication system for handling alarms for alarm data equalization, which describes a basic functionality in the manager-agent relationship. In this application, the agent sends the active alarms as a sequence of standardized M-EVENT-REPORTS that represent generic Common Management Information Service Element (CMISE) procedures based on ITU-T X.710. In addition, an ITU-T X.733 defines the content of a standardized alarm report.

SUMMARY OF THE INVENTION

It is accordingly an object of the invention to provide a method and a communication system for handling alarms using a management network that has a number of management levels, which overcome the hereinafore-mentioned disadvantages of the heretofore-known methods and devices of this general type and which can be used to achieve automatic coordination between the management devices on different levels during alarm handling.

With the foregoing and other objects in view, there is provided, in accordance with the invention, a method for handling alarms, which comprises the steps of providing a management network having at least two management devices on different management levels, receiving active alarms by the management devices, storing active alarms by one management device as agent or by the other management device as superior manager, handling active alarms for a specific period of time by operators that are coupled to the management devices, and introducing between the management devices a checking function having one or more checking attributes for reciprocal information about alarm handling.

Alarms can be stored either by one management device or by the other management device and can be handled for a specific period of time by operators that are coupled to the management devices on the basis that management devices receive active alarms. The subject matter of the invention involves introducing a checking function having one or more checking attributes for reciprocal information about alarm handling between the management devices.

The communication system for alarm handling has a communication interface between the management devices for introducing a checking function having one or more checking attributes for reciprocal information about alarm handling.

With the objects of the invention in view, there is also provided a communication system for handling alarms, including a management network having at least two management devices on different management levels receiving active alarms, one management device storing the active alarm as agent or the other management device storing the active alarm as superior manager, operators coupled to the management devices handling the active alarms for a specific period of time, and a communication interface between the management devices for introducing a checking function having one or more checking attributes for reciprocal information about alarm handling.

The checking function according to the invention results in automatic coordination between the management devices situated in a manager-agent relationship on different management levels during alarm handling. A disadvantage of management devices results from the responsibility for alarm handling being divided up on the basis of time and that the management device is not informed on its own management level about the latest changes in alarm handling on other management levels. The introduction of the checking function having checking attributes overcomes the disadvantage easily and with little signaling and, therefore, with low cost. The use of the checking function enables information about alarm handling to be interchanged for the first time. Furthermore, automatically coordinating the management devices causes optimization of fault management in the management network and a significant reduction of complexity for the operators.

According to particularly advantageous developments of the invention, the management device sets a checking attribute for identifying the handling status and/or a checking attribute for identifying the history of alarm handling for the stored active alarm. The checking attribute enables automatic coordination of alarm handling to be parameterized by the respective management device.

In accordance with another mode of the invention, there is provided the step of setting a checking attribute by the management device for identifying the stored active alarm.

In accordance with a further mode of the invention, there is provided the step of setting the checking attribute equal to a value used for identifying an alarm notification to be forwarded to the other management device.

In accordance with an added mode of the invention, there is provided the step of setting a checking attribute by a management device for identifying the handling status for the stored active alarm.

In accordance with an additional mode of the invention, there is provided the step of supplying the checking attribute with a value that indicates that no operator has noted the active alarm.

In accordance with yet another mode of the invention, there is provided the step of supplying the checking attribute with a value that indicates that an operator has confirmed the active alarm.

In accordance with yet a further mode of the invention, there is provided the step of supplying the checking attribute with a value that indicates that an operator has initiated repair measures for the active alarm.

In accordance with yet an added mode of the invention, there is provided the step of supplying the checking attribute with a value that indicates that an operator has eliminated the cause of the fault for the active alarm.

In accordance with yet an additional mode of the invention, there is provided the step of directing the management device to set a checking attribute for identifying the history of alarm handling for the stored active alarm.

In accordance with again another mode of the invention, there is provided the step of supplying the checking attribute with at least one pair of values, the first value of the pair of values indicating the instant at which a checking attribute used for identifying the handling status changes, and the second value of the pair of values indicating the name of the operator handling the active alarm.

In accordance with again a further mode of the invention, there is provided the step of supplying the checking attribute with a sequence of pairs of values based on handling of the active alarm by different operators.

According to a further advantageous refinement of the invention, should the agent perform alarm handling and make changes to the checking attributes, these changes are sent to the manager in a notification for updating alarm handling. As an alternative, should the manager perform alarm handling and set the checking attributes, these checking attributes are sent to the agent in a setting notification for investigating the handling status for the active alarm.

In accordance with again an added mode of the invention, there is provided the step of sending changes to the checking attributes to the manager in a notification for updating alarm handling when the agent performs alarm handling and makes changes to the checking attributes.

In accordance with again an additional mode of the invention, there is provided the step of sending checking attributes to the agent in a setting notification for investigating the handling status for the active alarm when the manager performs alarm handling and sets the checking attributes.

In accordance with still another mode of the invention, there is provided the steps of directing the agent to use an allocation table that contains, allocated to one another, respective values for identifying the alarm notifications and storing the respective values, forwarding the respective values for identifying the alarm notifications for the active alarms to the manager to identify an original alarm pertaining to the active alarm, and replacing the checking attribute identifying the current handling status with the checking attribute received in the setting notification.

In accordance with still a further mode of the invention, there is provided the step of directing the respective management device to apply the values and checking attributes set for the first alarm in a corresponding manner for the subsequent alarms when there is any correlation between a first active alarm and subsequent alarms.

In accordance with a concomitant mode of the invention, there is provided the steps of forming an operation and maintenance center by the management device acting as agent and forming a network management center that is superior to the operation and maintenance center by the management device acting as manager.

Other features that are considered as characteristic for the invention are set forth in the appended claims.

Although the invention is illustrated and described herein as embodied in a method and a communication system for handling alarms using a management network that has a number of management levels, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
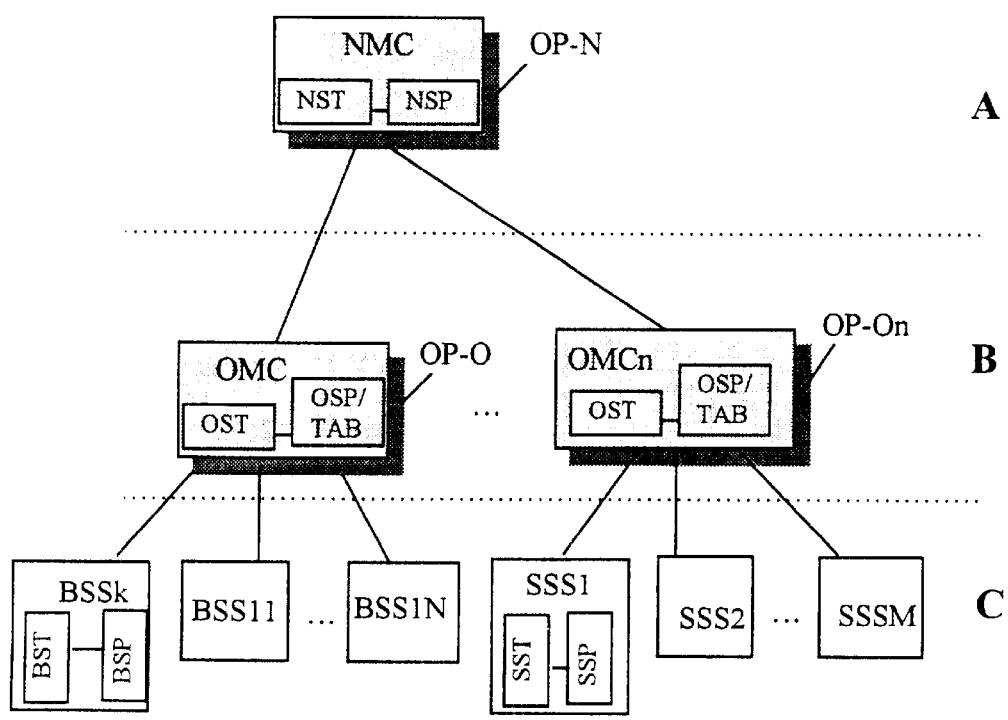
FIG. 1 is a block diagram of a management network for a mobile communication system having an agent-manager relationship between management devices on different levels, according to the invention.

Referring now to the figures of the drawings in detail and first, particularly to FIG. 1 thereof, there is seen a TMN concept for the management of a mobile communication system that, by way of example, has network elements in a mobile radio network based on the GSM standard. The invention is not restricted either to a GSM mobile radio network or to mobile radio networks in general, but can be applied to any kind of telecommunication network that uses a TMN management network.

A mobile communication system is a hierarchically structured system of different network elements, in which the bottom stage of the hierarchy is formed by the mobile stations. These mobile stations communicate, through a radio interface, with radio stations that form the next level in the hierarchy, called base stations. The base stations, which supply the mobile stations in a radio range of a radio cell, are preferably combined to cover a relatively large radio area and are connected to superior network elements, the base station controllers. The base stations and base station controllers are part of a base station subsystem of the mobile communication system. The base station controllers communicate, through defined interfaces, with one or more switching centers, the mobile exchanges, which are also used, among other things, for crossing to other communication networks. The mobile exchanges form, together with a plurality of databases, the switching subsystem of the mobile communication system.

In addition to the above network elements, there are one or more operation and maintenance centers, which, among other things, are used to configure and monitor the network elements. In this regard, operation and maintenance centers, which are normally constructed in the region of the mobile exchanges, usually remotely control monitoring measures and configuration measures. An operation and maintenance center communicates with a respective base station subsystem or switching subsystem through a defined interface. Fault management is one of the most important areas of a TMN. Under normal conditions, i.e. when communication between network elements and the operation and maintenance centers or between the operation and maintenance centers and a superior network management center is operationally available, the relevant alarms ("alarm notifications") from the network elements are forwarded to the operation and maintenance center and—if necessary—from there to the network management center. Active alarms are those alarms, the causes of which have not yet been eliminated in the network elements.

A further task of the operation and maintenance system is carrying out configuration management, which, in addition to fault management, represents one of five management function areas that identify the TMN principles. Configuration management defines a series of services that enable the user to change the structure, and, hence, the behavior, of a telecommunication network. The services always relate to instances of managed objects, which by and large form the network-specific management information base. A managed object, in the configuration management sense, is a logical abstraction of a resource in the mobile communication system. In this case, a distinction is made between hardware-related managed objects, which describe manufacturer-specific realization of a function, and function-related managed objects, which each involve abstraction of a set of functions that is independent of the manufacturer.

For managing the mobile communication system, the TMN principles define a plurality of levels, three of these levels being explained below in the present example with reference to FIG. 1.

FIG. 1 shows three respective levels A, B and C in the management network, of which management level C contains the network element level having a plurality of base station subsystems BSSk, BSS11 . . . BSS1N and BSS21, BSS22 . . . BSS2M, as well as a plurality of switching subsystems SSS1, SSS2 . . . SSSM. Management level B identifies the network element management level in which operation and maintenance centers OMC1 . . . OMCn each provide the manufacturer-specific management functions for individual subsystems, such as the operation and maintenance center OMC1 for the base station subsystems BSSk . . . BSS1N and the operation and maintenance center OMCn for the switching subsystems SSS1 . . . SSS2M in the present example. Management level A identifies the network management level in which at least one superior network management center NMC performs a respective integrated management function that is independent of the manufacturer. In this case, the network management center NMC has manager access to the network elements acting as agent on the next lowest management level B, in the present example, to the operation and maintenance centers OMC1 and OMCn. Defined interfaces for transferring information are provided between the network elements on different management levels.

As is known, the management devices can receive the alarms in each case, can store the alarms either by acting as agent (e.g., OMC, OMCn) or by acting as superior manager (e.g. NMC). Operators OP-N, OP-O, OP-On are coupled to the management devices that perform one or more alarm handling functions (e.g., confirmation of the alarm, examination of the fault message using the alarm data received, undertaking measures for eliminating the fault, processing information about the outcome of fault elimination). The management devices or their operators during the period of their responsibility can control these functions and perform them independently of one another.

When an alarm occurs, appropriate alarm handling actions are taken. The operator OP-N or OP-O, OP-On is notified visually and possibly acoustically as well of the alarm. Depending on the instant at which it occurs, alarm handling can take place either at the operation and maintenance center OMC, OMCn, or at the network management center NMC. Hence, alarm handling takes place at the respective operation and maintenance center OMC covering a specific region during the day, for example. Whereas, at night, on the weekend, or on public holidays, the alarms for the entire network will be handled at the superior network management center NMC, which is usually situated a long way from the individual regional operation and maintenance centers OMC . . . OMCn.

The following phases are possible in principle for alarm handling:

An operator first "confirms" the occurrence of an alarm, i.e., the operator notes the alarm. By confirming the alarm, the operator assumes responsibility for seeing that further steps for eliminating faults are carried out; on the other hand, this means that implicit coordination also takes place between a plurality of operators on the same management level, i.e., at an operation and maintenance center OMC during the day, for example.

The operator who has confirmed the occurrence of an alarm must then:

a) examine the fault message;
b) decide on repair measures;
c) instruct a service engineer at the site as appropriate; and
d) be informed of the outcome of the repair measures at the site.

Each of these individual steps may take a relatively long time to complete, so that, in the meantime, responsibility for alarm handling can change from the regional operation and maintenance center OMC to the superior network management center NMC.

The network management center NMC, each operation and maintenance center OMC . . . and each base station subsystem BSSk . . . or switching system SSS1 . . . all have a control device (see NST, OST, BST and SST) and a storage device (see NSP, OSP, BSP and SSP) connected to the respective control device. They also have transmission/reception devices (not shown in any greater detail) available for transmitting and receiving notifications and information through the interfaces between the different management levels. In this case, the notifications and information are transmitted on the NMC-OMC interface on the basis of a defined object model and on the OMC-BSSk interface or OMCn-SSS1 interface on the basis of another defined object model. Furthermore, the operation and maintenance centers OMC . . . OMCn have an allocation table TAB that contains, allocated to one another, respective values (notification identifiers) for the active alarms and for identifying those alarm notifications forwarded to the network management center NMC and those stored by the operation and maintenance center OMC.

Figure 2:
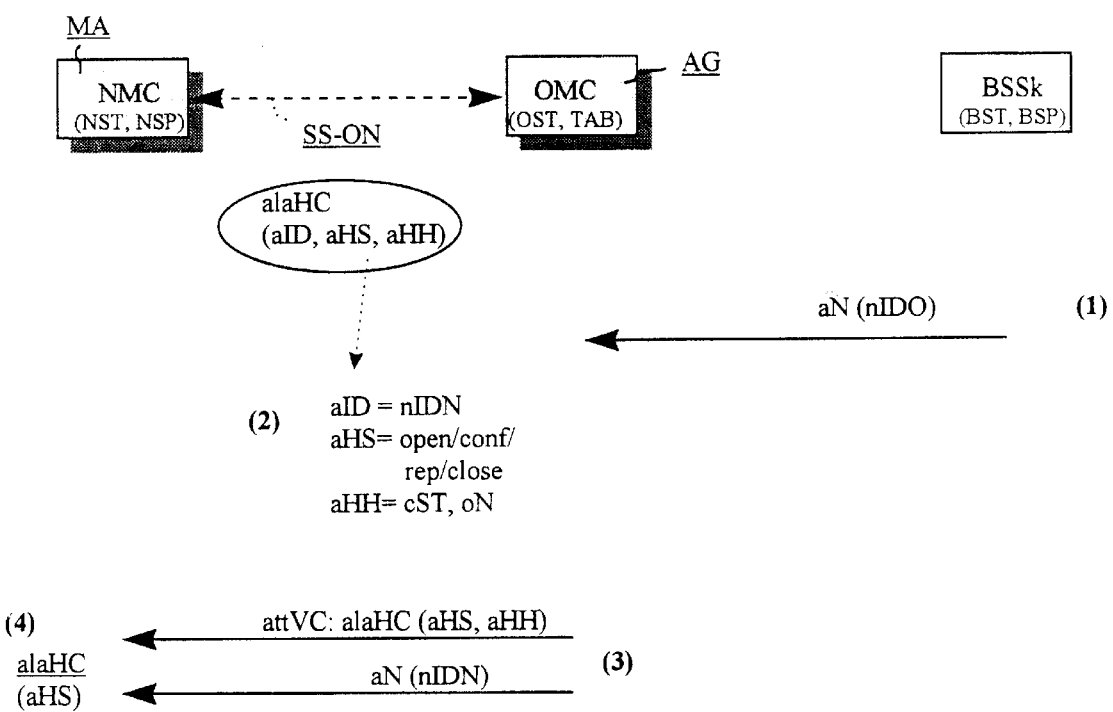
FIG. 2 is a block diagram of the notification flow between the agent and the manager for alarm handling performed by an operation and maintenance center.

FIG. 2 shows the notification flow between the agent AG and the manager MA for alarm handling, in accordance with the subject matter of the invention, performed by the operation and maintenance center OMC. The notification flow involves, by way of example, the network management center NMC as manager MA, having a control device NST and a storage device NSP, the operation and maintenance center OMC as agent AG, having a control device OST and a storage device OSP and an allocation table TAB, and the base station subsystem BSSk, having a control device BST and a storage device BSP.

According to the subject matter of the invention, automatic coordination takes place during alarm handling on the interface SS-ON between the management device OMC (with the connected operator OP-O, see FIG. 1) and the management device NMC (with the connected operator OP-N, see FIG. 1) on different management levels. For this purpose, a checking function alaHC (alarmHandlingControl) having one or more checking attributes aID (alarmID), aHS (alarmHandlingStatus), aHH (alarmHandlingHistory) is introduced for reciprocal information about alarm handling. At the OMC-NMC interface SS-ON, the checking function alaHC is defined as object class, for which an entry having the above checking attributes can be present for each active alarm:

- aID: This checking attribute is set by the management device (operation and maintenance center OMC or network management center NMC) for identifying the stored active alarm. The attribute preferably always has the same value as the parameter (notification identifier) of the alarm notification respectively forwarded to the other management device.

- aHS: This checking attribute can be set for identifying the handling status for the stored alarm. The attribute adopts one of the values open, conf, rep, close, where:
  "open" indicates that there is a new alarm that has not been noted by any operator;
  "conf" (confirmed) indicates that the alarm has been confirmed by an operator but no repair measures have been initiated yet;
  "rep" (repair) indicates that an operator has already initiated repair measures for the previously confirmed alarm; and
  "close" (closed) indicates that the cause of the fault has been eliminated for the alarm. The alarm is nevertheless still active, for example, because of a module not being initialized or the connection failing between network elements BSSk and the operation and maintenance center OMC.

- aHH: This checking attribute is set for identifying the history of alarm handling for the stored active alarm. The attribute contains at least one pair of values, of which the first value cST (changedStatusTime) indicates the instant at which the operator changed the checking attribute, and the second value oN contains the name of the operator handling the alarm. The respective management device OMC/NMC automatically assigns the name input of the operator to the value oN upon operator log in. Only operators having specific "alarm handling rights" may change alarm handling (including the changes to the status attribute aHS).

The checking attribute aHS preferably has a sequence of a number of pairs of values, so that, by way of example, the following logic steps are produced during alarm handling:

1. An alarm confirmed by a first operator called "ABC" (alarmHandlingStatus=confirmed) has, for the status attribute aHH, the value:
   <15.05.98 17:28><ABC> <00><00> <00><00>

2. An alarm that has been confirmed by the operator "ABC" and for which a second operator "XYZ" has initiated repair measures (alarmHandlingStatus=rep) and has successfully eliminated faults (alarmHandlingStatus=close) has, for the status attribute aHS, the value:
   <15.05.98 17:28><ABC> <15.05.98 20:15><XYZ> <15.05.98 22:30><XYZ>

An alarm may be indicated to the operator in different ways depending on the value of the status attribute aHS. For example, an "open" alarm is shown as flashing red, while a "conf" alarm is shown as non-flashing red.

The notification flow in FIG. 2 first shows an alarm notification aN that is generated by the network element (in the example, aN is generated by the base station subsystem BSSk) and reported to the management device OMC, these alarm notifications being defined on the basis of standardized M-EVENT-REPORT notifications in ITU-T X.710 (1). The management device OMC receives and stores the notification aN, which contains the value nIDO (notifID__OMC) in the notification field "notification identifiers". Subsequently, the management device OMC, on account of responsibility during the day, processes the alarm on the basis of the checking function alaHC (alarm mapping). In this instance, the management device OMC or its control device OST gives the status attribute aID the value nIDN (notifID__NMC) and gives the checking attributes aHS, aHH corresponding values depending on the processing status of the alarm (2). Due to the fact that the operation and maintenance center OMC is performing alarm handling and making the changes to the checking attributes, the OMC or its control device OST produces a notification attVC (attributeValueChange notification) and sends, in the latter, the changed checking attributes to the network management center NMC (3). Similarly, the operation and maintenance center OMC transmits the alarm in a new alarm notification aN (alarm notification) with the value nIDN (notifID__NMC). The network management center NMC can use the new checking attributes received—in particular, the checking attribute aHS—to update the checking function alaHC for alarm handling and its graphical display (4). In this way, during alarm handling automatic coordination between OMC and NMC and their operators is achieved through the interface SS-ON.

Figure 3:
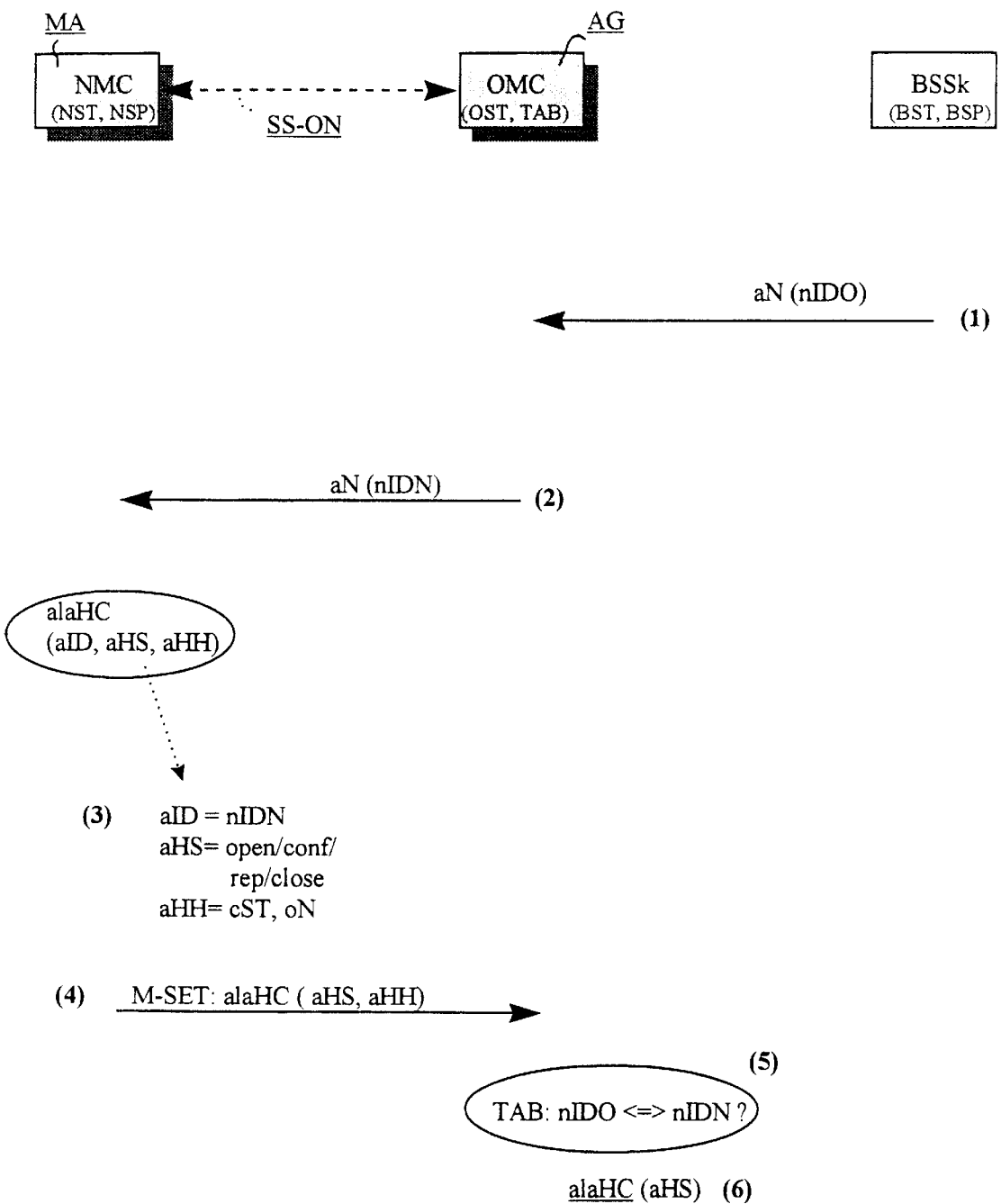
FIG. 3 is a block diagram of the notification flow between the manager and the agent for alarm handling performed by a network management center.

Similar to the example in FIG. 2, FIG. 3 shows a notification flow between manager MA and agent AG for alarm handling, according to the invention, performed by the network management center NMC. An alarm produced in the base station subsystem BSSk of the mobile radio network is reported to the management device OMC as an alarm notification aN. The management device OMC receives and stores the alarm notification aN, which, as in the example above, has the value nIDO (notifID__OMC) in the notification field "notification identifier". Subsequently, the management device OMC forwards the alarm to the network management center NMC in a new alarm notification, which has the other value nIDN (notifID__OMC) in the field "notification identifier" (2). In this instance, the operation and maintenance center OMC or its control device OST manages, for all active alarms, the allocation table TAB, which contains the allocations for the values nIDO<===>nIDN. Specifically, if, during the night, a new alarm (with "notification identifier"=nIDN) has been sent from the OMC to the NMC and "confirmed" by the NMC operator, the NMC applies the checking function alaHC, setting corresponding checking attributes aID, aHS, aHH (3). For this purpose, the checking function is able to learn automatically of the processing status of every active alarm through a setting notification—the command M-GET, which is CMISE-standardized in ITU-T X.710. In the setting notification M-SET, the checking function allocates the value nIDN to the checking attribute aID and the values corresponding to the current processing status in the NMC (4) to the checking attributes aHS and aHH. Using the allocation table TAB, the OMC will be able to identify (5) clearly the original alarm still flashing (with "notification identifier"=nIDO), change its checking attributes on the basis of the transmitted information and update the graphical display (e.g., not flashing). The checking attribute aHS received in the setting notification M-SET (6) preferably replaces the checking attribute aHS identifying the current handling status. Hence, the two management devices OMC and NMC have the same processing status as a result of automatic coordination on the basis of the checking function despite having different management levels.

An existing alarm correlation between a "primary" alarm and subsequent alarms must be taken into account in both the OMC and the NMC. If, for example, the "primary" alarm is "confirmed" at the OMC by the operator, the system must automatically change the attribute value aHS for the alarm and for all subsequent alarms associated with it. Accordingly, a plurality of notifications attVC (attributeValueChange notifications; see FIG. 2) are sent to the NMC as well.

I claim:

1. A method for handling alarms, which comprises:
   providing a management network having at least two management devices on different management levels;
   receiving active alarms by the management devices;
   storing active alarms by one management device as agent or by the other management device as superior manager;
   handling active alarms for a specific period of time by operators that are coupled to the management devices; and
   introducing between the management devices a checking function having at least one checking attribute for reciprocal information about alarm handling.

2. The method according to claim 1, which comprises setting a checking attribute by the management device for identifying the stored active alarm.

3. The method according to claim 2, which comprises setting the checking attribute equal to a value used for identifying an alarm notification to be forwarded to the other management device.

4. The method according to claim 1, which comprises setting a checking attribute by a management device for identifying the handling status for the stored active alarm.

5. The method according to claim 4, which comprises providing the checking attribute with a value that indicates that the active alarm has not been noted by any operator.

6. The method according to claim 4, which comprises providing the checking attribute with a value that indicates that an operator has confirmed the active alarm.

7. The method according to claim 4, which comprises providing the checking attribute with a value that indicates that repair measures for the active alarm have been initiated by an operator.

8. The method according to claim 4, which comprises providing the checking attribute with a value that indicates that an operator has eliminated the cause of the fault for the active alarm.

9. The method according to claim 1, which comprises directing the management device to set a checking attribute for identifying the history of alarm handling for the stored active alarm.

10. The method according to claim 9, which comprises providing the checking attribute with at least one pair of values, the first value of the pair of values indicating the instant at which a checking attribute used for identifying the handling status changes, and the second value of the pair of values indicating the name of the operator handling the active alarm.

11. The method according to claim 10, which comprises providing the checking attribute with a sequence of pairs of values based on handling of the active alarm by different operators.

12. The method according to claim 1, which comprises sending changes to the checking attributes to the manager in a notification for updating alarm handling when the agent performs alarm handling and makes changes to the checking attributes.

13. The method according to claim 4, which comprises sending changes to the checking attributes to the manager in a notification for updating alarm handling when the agent performs alarm handling and makes changes to the checking attributes.

14. The method according to claim 1, which comprises sending checking attributes to the agent in a setting notification for investigating the handling status for the active alarm when the manager performs alarm handling and sets the checking attributes.

15. The method according to claim 4, which comprises sending checking attributes to the agent in a setting notification for investigating the handling status for the active alarm when the manager performs alarm handling and sets the checking attributes.

16. The method according to claim 14, which comprises:
   directing the agent to use an allocation table that contains, allocated to one another, respective values for identifying the alarm notifications and storing the respective values;
   forwarding the respective values for identifying the alarm notifications for the active alarms to the manager to identify an original alarm pertaining to the active alarm; and
   replacing the checking attribute identifying the current handling status with the checking attribute received in the setting notification.

17. The method according to claim 15, which comprises:
   directing the agent to use an allocation table that contains, allocated to one another, respective values for identifying the alarm notifications and storing the respective values;
   forwarding the respective values for identifying the alarm notifications for the active alarms to the manager to identify an original alarm pertaining to the active alarm; and
   replacing the checking attribute identifying the current handling status with the checking attribute received in the setting notification.

18. The method according to claim 1, which comprises directing the respective management device to apply the values and checking attributes set for the first alarm in a corresponding manner for the subsequent alarms when there is any correlation between a first active alarm and subsequent alarms.

19. The method according to claim 1, which comprises forming an operation and maintenance center by the management device acting as agent and forming a network management center that is superior to the operation and maintenance center by the management device acting as manager.

20. A communication system for handling alarms, comprising:
- a management network having at least two management devices on different management levels receiving active alarms, one of said management devices storing the active alarm as agent or the other of said management devices storing the active alarm as superior manager;
- operators coupled to the management devices handling the active alarms for a specific period of time; and
- a communication interface between the management devices for introducing a checking function having at least one checking attribute for reciprocal information about alarm handling.

* * * * *